United States Patent Office 2,848,367
Patented Aug. 19, 1958

2,848,367

AUGMENTATIVE INTRINSIC FACTOR AND PROCESS FOR PREPARING IT IN HIGHLY PURIFIED FORM

William Lawrence Williams, New City, and Leon Ellenbogen, Spring Valley, N. Y., and Lester Otmar Olsen, Bergenfield, N. J., assignors to American Cyanamid Company, New York, N. Y., a corporation of Maine No Drawing. Application January 17, 1956
Serial No. 559,547

13 Claims. (Cl. 167—74)

This invention relates to improved methods of preparation of a therapeutic product having remarkable anti-anemia efficacy for treatable anemias.

More specifically, this invention relates to improved methods of preparation of intrinsic factor.

This invention also relates to an augmentative intrinsic factor and methods of preparation of such augmentative intrinsic factor.

Intrinsic factor is a heat labile component of normal human gastric juice which was first described by Castle and his associates, the American Journal of Medical Science, vol. 178, page 748, in the year 1929. Evidence presently indicates that intrinsic factor is involved in the utilization of vitamin $B_{12}$. In the classical condition in which a deficiency of intrinsic factor is found, namely pernicious anemia, small oral doses of vitamin $B_{12}$ are ineffective unless a source of intrinsic factor is administered simultaneously. The study of gastric intestinal absorption with radioactive vitamin $B_{12}$ in pernicious anemia patients and healthy individuals has proven that intrinsic factor is essential for this absorption (Ellenbogen, Williams, Rabiner and Lichtman—Proceedings of the Society for Experimental Biology and Medicine 89, 357, 1955). Although hematopoietic responses in pernicious anemia may follow the oral administration of massive doses of vitamin $B_{12}$ given without the intrinsic factor, the absorption of the vitamin, when amounts comparable to those found in an average diet are ingested, involves a participation of intrinsic factor.

A number of methods of preparation of intrinsic factor have been disclosed in the prior art; however, in all of them, difficulties have been encountered in that extremely low yields of therapeutically active concentrate of intrinsic factor are obtained as compared to the present process. Therefore, the availability of sufficient quantities of such therapeutically active materials has been limited and the cost thereof has been maintained at much higher levels than would be desired.

One of the principal objects of the present invention is, therefore, to provide improved methods of preparing a therapeutically active concentrate of intrinsic factor from animal intestine for use in therapeutic compositions, and more particularly, it is to provide improved and more efficient methods of preparing greatly increased yields of substances having intrinsic factor activity for use as described above from animal duodenum, particularly hog duodenum.

It is a further principal object of the present invention to provide improved methods of preparing a therapeutically active concentrate of intrinsic factor from duodenum which possesses greater activity and potency whereby the quantities of required daily dosage are reduced.

In a recently filed application, Serial No. 459,506, filed September 30, 1954, and now abandoned, by one of the present inventors, a new method is described for the preparation of intrinsic factor in considerably higher yields and of higher potency than that of the prior art. The present methods are an improvement over the methods and products described therein.

The yield of the product produced by ammonium sulfate precipitation in the instant process was about 15 times that of the above process (application Serial No. 459,506). Although being of the same potency, 30 milligrams equaling one daily dose, the intrinsic factor concentrate from the new process has a unique characteristic. The old process intrinsic factor (application Serial No. 459,506) as well as the products from other prior art processes inhibit the uptake of vitamin $B_{12}$ by healthy individuals whereas the preparation of intrinsic factor from our new process in marked contrast unexpectedly increases the uptake of the vitamin $B_{12}$ in healthy individuals. Of course, all intrinsic factor preparations increase the uptake of vitamin $B_{12}$ in pernicious anemia patients, our product being unique only in its effect on persons who do not suffer from pernicious anemia. Obviously, this unique characteristic of the product produced by the present invention is very important. Vitamin $B_{12}$ has long been known for its growth promoting activity. Since the new intrinsic factor of the present invention increases the uptake of vitamin $B_{12}$, it can be advantageously used, for not only the treatment of anemias, but as a growth promoting factor. It will thus enable the subject to absorb more of the vitamin $B_{12}$ administered. As a consequence, it will make such therapy less expensive and more effectively administered.

It is therefore a further principal object of the present invention to provide a therapeutically active concentrate of intrinsic factor possessing greater activity and potency that is augmentative to the uptake of vitamin $B_{12}$. The present invention unexpectantly achieves this highly desirable result.

In the present methods, the intrinsic factor concentrate is prepared from the small intestine of a commercially available animal, preferably the duodenum, most desirably, the hog duodenum. The outside of the tissue is washed for a few seconds in water at about 30° C.; the inside of the tissue is not washed. Loose adhering fat is removed from the outside of the tissue and the contents of the intestine, if present, are expelled manually. If the intestine is not processed for intrinsic factor immediately, the tissue is quickly frozen in flat layers with the aid of crushed Dry Ice or by the use of a wind tunnel and kept frozen in a chilled room at −10° C. until used.

The intestine is then preferably fed into a meat grinder; it may, however, be minced with an axe or knife. The ground or minced tissue is then slurried in a 0.5 to 3% solution of sodium chloride (preferably 2%) in the ratio of approximately one part of tissue by weight to 3 to 5 parts of solution by volume. The intestine tissue is then slurried in the saline solution and subsequently allowed to settle. A period of 30 to 60 minutes has been found to be generally satisfactory for each of the slurrying step and the settling step. However, this time limitation is not generally critical; it will vary with the size of the batch and concentration of the saline. As a matter of fact, as is illustrated below, the settling step is sometimes dispensed with entirely. The tissue solids are then partially removed by filtration, decanting, or some other separatory procedure. The solid residue is then preferably extracted again once or several times with the saline solution, the solids again partially removed, and the several extracts combined.

The pH of the combined extracts is then adjusted to a pH of from 7 to 10 by the slow addition of an alkaline material such as sodium hydroxide with stirring (a pH of 9 is preferred). This solution is allowed to stand to destroy pepsin. The pH is then adjusted to approximately 1.0 to 2.5 and the solution allowed to stand to precipitate out undesired muco-proteins and other impurities (a pH of 1.5 to 2.0 is preferred). Thirty minutes has been generally found to be a satisfactory standing period for each of the pepsin destroying step and the muco-proteins destroying step, but for the reasons set out above, this specific time limitation is not critical.

The combined extracts obtained by the procedures described in the preceding paragraph are clarified by centrifuging or some equivalent procedure. Any standard centrifuge may be used; however, it is preferred to use the Sharples centrifuge model No. M–86–P–IE, maximum R. P. M., 15,000. The pH of the clear filtrate is then adjusted to from about 3.9 to 6.1, preferably 4.5 (the isoelectric point of intrinsic factor is found in this range). A material is then added to precipitate the intrinsic factor. Ammonium sulfate has been found to be the preferred material; however, various common soluble inorganic salts will perform this function. Moreover, various inorganic-organic salts or inorganic salts plus an alcohol are also suitable. Examples of the first category are sodium sulfate, sodium chloride, etc. Examples of the latter two categories are zinc acetate plus ethanol and ferric chloride plus ethanol, respectively. Other equivalent procedures for precipitating proteinaceous materials are found in the literature. See, for example, Amino-Acids and Proteins—Therapy, Methods, Applications by David M. Greenberg, published in 1951 by Charles C. Thomas, Springfield, Illinois—pages 276 and 277 appear to be of particular interest. See also, The Proteins-Chemistry, Biological Activity and Methods, vol. I, part A, edited by Hans Neurath and Kenneth Bailey, published in 1953 by Academic Press, Inc., New York, N. Y., pages 49 to 57.

The solution is allowed to stand until the precipitate is completely formed. This standing period will generally run from ½ hour to 20 hours; 16 hours has generally been found to be the optimum. This time limitation is not critical as one can visually determine when precipitation is substantially complete. The precipitate is then collected by centrifuging or some other separatory means. The precipitate obtained in this manner may then be dialyzed to further purify the product. However, the product obtained upon centrifuging is suitable for use without dialysis. After dialysis, the material may be freeze-dried or dried by some other conventional method.

It has been indicated above that the various separatory procedures are not critical in their identity. In other words, various procedures equivalent to those described above may be used. The separatory procedure for removing the tissue solids from the saline extract is, however, one of the unique features of the present process. It is also one of the critical features of the present process in that through its use we have been able to obtain a product of much higher purity and much higher potency in much larger yields than anything heretofore produced. In the past, it has been the practice to remove all solids from the saline extract; see Prusoff et al., The Journal of Hematology, vol. VIII, No. 6, pages 491 to 501 (particularly page 492), June 1953. We have unexpectedly found that if controlled amounts of the total solids (i. e. tissue solids dissolved in the saline solution plus tissue solids which are insoluble therein) are carried from the initial saline slurry phase through the separatory means to the saline extract phase, the high yields of highly purified, highly active intrinsic factor are produced.

The amount of total tissue solids carried over into the saline extract phase should be in the range of from about 35% to about 60% by weight of the initial weight of the tissue starting material. Both limits of this range are essential to the efficient operation of the instant process; the lower limit is critical, however, whereas the upper one is not. If the total tissue solids allowed to pass from the slurry phase to the extract phase are substantially lower than 35%, the yield of finished product is very substantially reduced. If the total tissue solids allowed to pass from the saline slurry phase to the saline extract phase substantially exceed 60%, then the purity of the finished product may be materially reduced. However, by carefully controlling conditions so that no undue contamination of the product results, it is plausible to exceed this upper limit of 60%. For the most part, this is not feasible, however, where large commercial lots of the product are being produced. A range of from about 43% to about 47% total tissue solids has been found to produce very good results, with a value of about 45% total tissue solids producing optimum results in terms of the yield, activity, and purity of the finished product.

Filtering through cheesecloth is considered one of the best methods for separating the solid tissue from the aqueous saline solution in terms of efficiency, expense, time and facility of operation. However, other methods may be substituted therefor, the only limitation on them being those described above with respect to the total solids allowed to pass from the saline slurry phase through the separatory means to the saline extract phase. As a matter of fact, the Titan automatic intermittent sludge discharge centrifuge (a dish type machine having a feed rate of about 300 to 500 gallons per hour manufactured by the Pitmar Corporation of Baltimore, Maryland), is a better separatory device than cheesecloth in terms of time and ease of operation. Other centrifuges, for example, the Super-D-Canter, a continuous sludge discharge horizontal centrifuge made by Sharples Corporation of Philadelphia, Pennsylvania, with the aid of Alpha Fluff (Solka Floc product, comprising wood cellulose manufactured by Brown Company, Boston, Massachusetts), may be used in place of cheesecloth or the Titan centrifuge. Alpha Fluff is added to the tissue slurry at a concentration of about 1% by slurry weight. This adds stiffness to the meat particles thereby increasing the efficiency of the Super-D-Canter. Such equipment usually operates at a feed rate of about 300 to 400 gallons per hour. The Sharples centrifuge, model No. M–86–P–IE, referred to above has been tested and found to be satisfactory. Alternatively, a perforated basket type centrifuge may be used. Such a centrifuge has a liner associated with the basket. A cheesecloth liner has been found to be satisfactory in this case. The Westphalia hollow-bowl centrifuge made by Centrico of Englewood, New Jersey, using Alpha Fluff has also been tested and found to be satisfactory. Vacuum filters such as the well-known Oliver filter may be used in place of the cheesecloth or the Titan centrifuge. Hydraulic pressing can be used in place of the cheesecloth or in addition to the cheesecloth or in conjunction with the cheesecloth. Manual decanting, of course, could be substituted for these various separatory procedures; other equivalent procedures will occur to those skilled in the art.

The exact composition of the saline solution used throughout this process is not critical. A 2% saline solution has been indicated as being preferred; however, the limitations on this concentration are only those of commercial practicality. The volume of saline solution can vary, but, of course, the greater the dilution the more costly the resulting voluminous solution is to handle. Similar considerations arise with more concentrated solutions: i. e. precipitation of intrinsic factor, cost of material, caking in the equipment used, etc.

It has been indicated that preferably the Sharples centrifuge referred to above be used to separate the undesirable muco-protein solids and other impurities resulting from adjusting the pH to 1.5 to 2.0. It is preferred since it most expeditiously removes the solids in terms of time, expense and efficiency of operation. Other equivalent separatory means may be substituted for the Sharples centrifuge, as long as they completely clarify the solution. For example, the De Laval bowl type continuous desludging centrifuge model AC–VO, made by De Laval Separator Company, Poughkeepsie, New York, has been used, and satisfactory results were obtained. In addition other separation equipment is suitable for this step, for example, the well-known Nerofil filter aid (petroleum coke made by the Dicalite Division of the Great Lakes Carbon Corporation) and Chrysolite No. 5 filter aid (a blend of asbestos and cellulose fibers made by the Hercules Filter Company, Hawthorne, New Jersey). The above described separatory equipment may be used on Buchner funnels utilizing a vacuum to aid in separation.

The invention broadly described will be further illustrated in greater detail by the following specific examples. It should be understood however, that although these examples may describe in particular detail some of the more specific features of the present invention, they are given primarily for the purpose of illustration, and the invention in its broader aspects is not to be construed as limited thereto.

EXAMPLE 1

*Process for the production of commercial intrinsic factor concentrate starting with fresh unfrozen hog duodenum*

1.75 kg. of hog duodenum from freshly killed hogs is fed into a meat grinder. The ground tissue is slurried in a 2.0% solution of NaCl in the ratio of 1 part of duodenum by weight to 5 parts of solution by volume (8.75 liters of 2.0% NaCl). The saline is originally at a temperature of 10° C. and is maintained at this temperature in jacketed tanks containing water flowing through the jacket at this temperature. The ground tissue is stirred in the NaCl solution for 30 minutes, the agitation is stopped and the slurry formed thereby is allowed to settle for 30 minutes. After settling, the slurry is poured two times through one layer of cheesecloth. The residue is once again extracted with one volume (1.75 liters) of 2% NaCl solution and the two extracts are combined. The combined extracts are adjusted to pH 9.0, by the slow addition of 5.0 N NaOH, with stirring. The solution at this point is permitted to stand one-half hour. At the end of this time, the solution is adjusted to pH 1.5 by the slow addition of 5.0 N HCl with stirring, and permitted again to stand for one-half hour. At the end of this time, a precipitate forms and it is removed by feeding it into a Sharples centrifuge (model #M-86-P-IE, maximum R. P. M. 15,000) at the rate of about 5.0 liters per minute at about 15,000 R. P. M. The clear filtrate is then adjusted to pH 4.5 by the slow addition of 5.0 N NaOH with stirring. Ammonium sulfate is then added slowly with stirring ot the filtrate in the amount of 368 gms. per liter of liquid. The solution is then left to stand 16 hours, at the end of which time the precipitate is collected by Sharples centrifugation. The precipitate is removed from the Sharples bowl and sufficient water is added to the precipitate to obtain a thick slurry. This thick slurry is placed in cellophane bags and is dialyzed for seven hours in a rotating laboratory dialyzer against cold running tap water. An air space is allowed in each dialysis bag of such size that stirring is obtained inside the bag during the dialysis. After dialysis the matter is freeze-dried.

EXAMPLE 2

*Process for the production of commercial intrinsic factor concentrate starting with frozen hog duodenum*

10 kg. of frozen tissue is chopped with an ax in order to permit it to be fed while frozen into a meat grinder. The ground tissue is slurried in 30 liters of a 2.0% solution of NaCl (1 part of duodenum by weight to 3 parts of solution by volume). The saline solution is originally at a temperature of 10° C., and it is maintained at this temperature in a jacketed tank containing water flowing through the jacket at about 10° C. The temperature of the solution drops to about 3° to 5° C., upon the addition of frozen ground duodenum, but returns to 10° C. after about one-half hour. The ground duodenum is stirred in the NaCl solution for 30 minutes, at the end of which time the agitation is stopped and the slurry formed thereby is allowed to settle. After 30 minutes of settling, the material is poured through a double thickness of cheesecloth. The residue is extracted two times with one volume (10 liters) of 2.0% NaCl solution each time. The stirring and settling times are reduced to 10 minutes and 15 minutes, respectively for later two re-extractions. The combined extracts are then further processed exactly as described in Example 1 except that 1.0 N NaOH and 1.0 N HCl are used instead of 5.0 N for pH adjustments, and the period of standing after the introduction of the precipitating agent is extended to about 20 hours.

EXAMPLE 3

*Preparation of highly purified intrinsic factor concentrate*

The beginning of the process is essentially the same as described in Example 2 until after the centrifugation of the pH 1.5 ppt.

The supernatant from the pH 1.5 ppt. is adjusted to pH 4.5 by the slow addition of 1.0 N NaOH, and ammonium sulfate is added to the supernatant in the amount of 174 gm./liter of liquid, slowly with stirring. The solution is then allowed to stand for four hours, at the end of which time it is centrifuged in the Sharples centrifuge at the rate of about 0.5 liter per minute to obtain a clear filtrate. To the resulting filtrate, 194 gm. of $(NH_4)_2SO_4$ per liter of filtrate is added slowly with stirring and allowed to stand for about 14 hours. This solution is then centrifuged in the Sharples centrifuge at the rate of about 0.5 liter per minute to obtain a clear filtrate. The precipitate is removed from the Sharples bowl and sufficient water is added to obtain a thick slurry. The thick slurry is placed in cellophane membranes and dialyzed in a laboratory rotating dialyzer against cold running tap water for about 4–6 hours. An air space is allowed in each bag of such size that thorough stirring is obtained inside the bag. After dialysis the material inside the bag is centrifuged in the preparatory head of an ultracentrifuge at 15,000 gravities for 15 minutes. The resulting precipitate is washed with cold 2% NaCl solution and recentrifuged at the same speed. The residue is discarded and the supernatants are adjusted to pH 4.5 with 1.0 N HCl. Ammonium sulfate is then added slowly to the supernatant in the amount of 368 gm./liter of solution and the solution is then allowed to stand for about 14 hours. The resulting solution is then centrifuged at 20,000 gravities for 10 minutes. The precipitate is once again suspended in water and dialyzed for 4–6 hours. After this dialysis the material in the bag is centrifuged at 15,000 gravities for 15 minutes and the precipitate is washed once with cold 2% NaCl solution. This precipitate is discarded and the clear solution is dialyzed for at least 4 hours to free the sodium chloride. The material in the dialyzing bags is then freeze-dried. This material is called "reprecipitated ammonium sulfate fraction" (RAS). It was tested at 5 mg. and found to be active, as compared with the product from the production batch which was active at 30 mg. This fraction contains 2 to 3 peaks as observed by ultracentrifugal analysis. The highest molecular weight peak (sedimentation constant of 4.0) seems to contain most of the activity of the highly purified RAS fraction and is separated from the low molecular weight material by ultracentrifugation as follows:

1.3 gm. of RAS fraction is dissolved in 130 cc. of phosphate-saline buffer of pH 6.4 and subjected to a centrifugation of 100,000 gravities for 18 hours. The resulting supernatant is collected; this contains the low molecular weight fraction. The pellet (or solid matter collected) is resuspended in phosphate-saline solution and centrifuged at 9,000 gravities for 10 minutes. The resulting supernatant solution contains the high molecular weight material. It has improved homogeneity and it appears to contain most of the intrinsic factor activity (895 mg. of low molecular weight material versus 321 mg. of high molecular weight material). This high molecular weight material has activity at about 2 mg. (activity rated by administration to pernicious anemia patients in relapse).

EXAMPLE 4

*The process for the production of commercial intrinsic factor concentrate in bulk amounts starting with frozen hog duodenum*

454 kg. of frozen tissue is chopped with an axe in order to permit it to be fed while frozen into a meat grinder. The ground tissue is slurried in 1,362 liters of a 2.0% solution of NaCl (1 part of duodenum by weight to 3 parts of solution by volume). The saline solution is originally at a temperature of 10° C. and it is maintained at this temperature in a jacketed tank containing water flowing through the jacket at about 10° C. The temperature of the solution drops to about 3° to 5° C. upon the addition of frozen duodenum. The duodenum is stirred in the NaCl solution for about 50 minutes to form a slurry. The slurry is pumped while continuing to agitate to a No. 4 mesh screen which removes long fibers. The slurry is then pumped to a Titan Automatic Intermittent Sludge Discharge Centrifuge to which it is introduced at a rate of about 500 gallons per hour. The supernatant is collected as it is discharged. The sludge is collected as discharged and then re-extracted in 681 liters of the 2% saline solution (1 part of sludge by weight to about 1½ parts of saline solution by volume). The re-extracted sludge is then stirred in the saline solution for about 30 minutes at the end of which time it is pumped again to the No. 4 mesh screen while continuing to agitate and then to the Titan centrifuge where the supernatant again is removed. The pH of the supernatants is then adjusted to about 9.0 by the slow addition of 5.0 N NaOH with stirring. The solution at this point is then permitted to stand ½ hour. At the end of this time the solution is adjusted to a pH of about 2.0 by the slow addition of 50% HCl with stirring and permitted again to stand for ½ hour. At the end of this time a precipitate forms and it is removed by feeding it into a Sharples centrifuge (model No. M-86-P-IE, maximum R. P. M. 15,000) at the rate of about 0.5 liter per minute at about 15,000 R. P. M. The clear filtrate is then adjusted to a pH of about 4.5 by the slow addition of a 5.0 N NaOH with stirring. Ammonium sulfate is then added slowly with stirring to the filtrate in the amount of 368 grams per liter of liquid, the solution is then left to stand for about 16 hours, at the end of which time the precipitate is collected by a Sharples centrifugation. The precipitate is removed from the Sharples bowl and sufficient water is added to the precipitate to obtain a thick paste. This thick slurry is placed in viscose-cellulose tubing and is dialyzed for about 27 hours in an oscillating dialyzer against cold running tap water. An air space is allowed in each dialysis tube of such size that stirring is obtained inside the tube during the dialysis. After dialysis, the material is freeze-dried.

EXAMPLE 5

The procedure of Example 4 is repeated utilizing all of the same quantities, temperatures, etc. However, the Westphalia hollow-bowl centrifuge is used in place of the Sharples centrifuge after both the 2.0 pH adjustment and in collecting the ammonium sulfate precipitate at a feed rate of 300 gallons per hour. Moreover, the feed rate into the Titan centrifuge is 300 gallons per hour; the solution is left to stand twelve hours after adding the ammonium sulfate to it, and the resulting precipitate is dialyzed for 24 hours.

EXAMPLE 6

The procedure of Example 4 is again repeated, however, in this case the Titan automatic intermittent sludge discharge centrifuge is substituted for the Sharples centrifuge after the 2.0 pH adjustment step. Moreover, the solution is left to stand two hours after the ammonium sulfate is added; the precipitate is dialyzed for 30 hours, and the feed rate of the Titan centrifuge is 400 gallons per hour.

The following absorption experiments illustrate the unique and unexpected property of the product produced by the instant process; i. e. its augmentative quality in healthy individuals.

GENERAL TECHNIQUE

Each treatment was made on a group consisting of ten young healthy males. All individuals received a 50 $\mu$g. oral dose of radioactive vitamin $B_{12}$ and 1 $\mu$g. of unlabeled vitamin $B_{12}$ parenterally. Their urine was collected for 24 hours. Diets were the same for all, both before and during the experiments. The amount of radioactive vitamin $B_{12}$ excreted is a measure of the amount absorbed from the gut into the tissues. The higher the urinary excretion the higher was the gastrointestinal absorption. In each of the following tables the various amounts of intrinsic factor concentrates used are equivalent to 4 daily oral doses as determined from pernicious anemia cases in relapse.

1ST EXAMPLE

|  | Millimicrograms Vitamin $B_{12}$ Excreted In First 24 Hours | Comments |
| --- | --- | --- |
| Group 1—No intrinsic factor | [1] 442±12 | Absorption due to person's own intrinsic factor. |
| Group 2—100 mg. intrinsic factor from hog duodenum process (this application). | 537±70 | Augments further absorption. |
| Group 3—100 mg. intrinsic factor (Company A's dried hog stomach-process disclosed in application No. 459,506). | 354±19.5 | Inhibits Absorption. |
| Group 4—400 mg. intrinsic factor as in Group 3. | 313±50 | Do. |
| Group 5—100 mg. Company A's intrinsic factor concentrate. | 325±16 | Do. |

[1] Standard error of the mean.

*Effect of various intrinsic factor preparations on absorption of vitamin $B_{12}$ by healthy subjects*

2ND EXAMPLE

|  | Intrinsic Factor Preparation Administered | Millimicrograms Vitamin $B_{12}$ Excreted In 24 Hours | Comments |
| --- | --- | --- | --- |
| Group 1 | None | 490±31.8 | Absorption due to person's own intrinsic factor. |
| Group 2 | 100 mg. intrinsic factor From Company A's dried hog Stomach (application Serial No. 459,506). | 364±25.5 | Inhibits Absorption. |
| Group 3 | 100 mg. intrinsic factor (material from fresh hog duodenum process—this application). | 639.5±63.4 | Augments further absorption. |
| Group 4 | 100 mg. intrinsic factor—process of this application using hog stomach. | 428.3±37.1 | Inhibits Absorption. |

Each of the five groups consisted of eight healthy males who received in addition to the intrinsic factor preparation fifty micrograms of radioactive vitamin $B_{12}$. Using the urinary excretion technique a lower value in the urine signifies less absorption from the gut.

The intrinsic factor prepared from company A's dried and defatted hog stomach by the process found in application Serial No. 459,506 inhibits the uptake of vitamin $B_{12}$ from the gut of young healthy males who already possess intrinsic factor in their own stomachs. As shown in the 1st Example, group 5, company A's intrinsic factor concentrate which is made from hog stomach is also inhibitory. Of special importance are groups 3 and 4 of Example 2. The duodenums and stomachs were removed from the same 25 hogs and processed separately in a fresh tissue process on the same day. The intrinsic factor from the duodenums was used in group 3 and the stomachs in group 4. Therefore, it was found unexpectedly that duodenum does not contain the material which inhibits $B_{12}$ uptake whereas the stomach does. This further illustrates the uniqueness of intrinsic factor produced from duodenum by the process described in this application.

*Effect of various intrinsic factor preparations on absorption of vitamin $B_{12}$ by healthy subjects*

3RD EXAMPLE

|  | Intrinsic Factor Preparation Administered | Millimicrograms Vitamin $B_{12}$ Excreted In 24 Hours | Comments |
|---|---|---|---|
| Group 1 | None | [1] 528.6±37.8 | Absorption due to person's own intrinsic factor. |
| Group 2 | 100 mg. intrinsic factor as made in application Serial No. 459,506. | 394.7±62.3 | Inhibits Absorption. |
| Group 3 | 200 mg. Company B's intrinsic factor concentrate. | 492.6±89.4 | Do. |
| Group 4 | 800 mg. Company C's intrinsic factor concentrate. | 497.4±50.1 | Do. |

[1] Standard error of the mean.

The above example further illustrates the fact that the various intrinsic factor preparations available prior to this invention inhibit the absorption of vitamin $B_{12}$ in subjects not suffering from pernicious anemia.

We claim:

1. A process for preparing augmentative intrinsic factor which comprises comminuting animal intestine material, slurrying said comminuted intestine material in a saline solution, partially removing tissue solids to produce an extract phase containing at least 35% total tissue solids, adjusting the pH of the extract phase to approximately 7 to 10 in order to destroy pepsin, then adjusting the pH to approximately 1.0 to 2.5 to precipitate out undesired muco-proteins and other impurities, removing the resultant precipitate from the solution, discarding the thus removed precipitate, adjusting the pH of the clear filtrate to about 3.9 to 6.1, adding a precipitating agent to precipitate the intrinsic factor.

2. The process of preparing augmentative intrinsic factor which comprises comminuting hog duodenum, slurrying said comminuted hog duodenum in a 2% saline solution, partially removing tissue solids to produce an extract phase containing approximately 45% total tissue solids, adjusting the pH of the extract phase to approximately 9 in order to destroy pepsin, then adjusting the pH to approximately 1.5 to 2.0 to precipitate out undesired muco-proteins and other impurities, removing the resultant precipitate from the solution and discarding it, adjusting the pH of the clear filtrate to approximately 4.5, adding ammonium sulfate to precipitate the crude intrinsic factor, purifying this precipitate by dialysis followed by freeze-drying.

3. The process of claim 1 wherein the extract phase contains from about 35% to about 60% total tissue solids.

4. The process of claim 1 wherein the extract phase contains from about 43% to 47% total tissue solids.

5. The process of claim 1 wherein the animal intestine material is hog duodenum.

6. The process of claim 1 wherein the saline solution is one containing from about 0.5 to 3% sodium chloride.

7. The process of claim 1 wherein the precipitating agent comprises ammonium sulfate.

8. The process of claim 1 wherein the precipitating agent comprises sodium sulfate.

9. The process of claim 1 wherein the precipitating agent comprises sodium chloride.

10. The process of claim 1 wherein the precipitating agent comprises zinc acetate plus ethanol.

11. The process of claim 1 wherein the precipitating agent comprises ferric chloride plus ethanol.

12. The process of claim 1 wherein the intrinsic factor is further purified by dialysis and then freeze-dried.

13. Augmentative intrinsic factor prepared by the method of claim 1.

References Cited in the file of this patent

Prusoff: Blood, The J. of Hematology, vol. 9, No. 6, June 1953, pp. 491–501 (part. pp. 492–494).